United States Patent Office 3,558,652
Patented Jan. 26, 1971

---

3,558,652
N-MONOSUBSTITUTED PYRRYL-AMINOETHANOLS
Uberto M. Teotino and Davide Della Bella, Milan, Italy, assignors to Whitefin Holding S.A., Lugano, Viale C. Cattaneo, Switzerland
No Drawing. Filed May 8, 1967, Ser. No. 636,625
Claims priority, application Great Britain, May 17, 1966, 21,778/66
Int. Cl. C07d 27/26
U.S. Cl. 260—326.5                            1 Claim

ABSTRACT OF THE DISCLOSURE

Compounds acting on the central nervous system, on the autonomic nervous system and on the cardiovascular system, comprised in the formula:

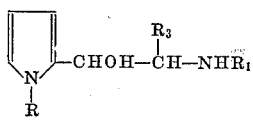

wherein R is selected in the group comprising alkyl, aryl and arylalkyl radicals which may be substituted by at least one radical selected in the group comprising halogen atoms, alkyl, hydroxy, alkoxy, trifluoromethyl, nitro, amino, mono- or di-alkylamino radicals; $R_1$ is selected in the group comprising hydrogen, alkyl and cycloalkyl radicals; $R_3$ is selected in the group comprising hydrogen and alkyl radicals and their salts with organic and inorganic acids and alkyl halides.

---

This invention relates to N-monosubstituted pyrrylaminoethanols and methods for their preparation.

The monosubstituted aminoethanols according to this invention have the formula:

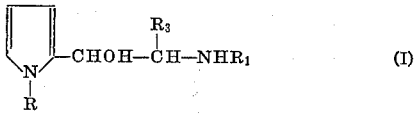

wherein R is an alkyl, aryl or arylalkyl group which may be substituted by one or more halogen atoms, an alkyl, hydroxy, alkoxy, trifluoromethyl, nitro, amino, or mono- or di-alkylamino radical; $R_1$ is a hydrogen atom or an alkyl or cycloalkyl radical; $R_3$ is a hydrogen atom or an alkyl radical; and their salts with organic and inorganic acids and alkyl halides.

This invention includes pharmaceutical preparations containing the monosubstituted aminoethanols of this invention or their physiologically tolerable salts with acids or alkyl halides in admixture or conjunction with a pharmaceutically acceptable carrier or diluent.

The monosubstituted aminoethanols of this invention can be prepared according to this invention by hydrogenating a compound of the general formula:

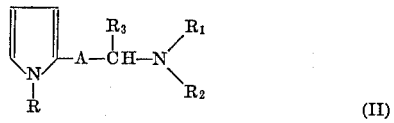

wherein R, $R_1$ and $R_3$ have the meanings given above and $R_2$ is a hydrogen atom or a benzyl group; A is —CO— or —CHOH—.

When $R_2$ is a hydrogen atom and A is a carbonyl group the reduction is preferably carried out in the presence of an inert solvent with a reducing agent such as lithium aluminium hydride, sodium boro-hydride or aluminium isopropoxide at a temperature ranging from 0° to 90° C. for from 2 to 60 hours. This method is particularly useful for reducing only the keto-group when there are other groups in the molecule which may be affected by hydrogenation.

When $R_2$ is a benzyl radical and A is a secondary alcohol (CHOH) gorup, the monosubstituted aminoethanols may be prepared by splitting off the benzyl group with hydrogen in the presence of a hydrogenation catalyst such as 5% palladium on carbon and an inert solvent at atmospheric pressure and at from 15° to 60° C. until the theoretical amount of hydrogen has been taken up. This process is particularly useful when there are no other groups in the molecule which may be affected by catalytic hydrogenation or when, such groups being present, the benzyl group is to be simultaneously split off and the other groups are to be reduced.

The compounds of the general Formula II, used as starting materials for preparing the compounds of this invention, may well be prepared as disclosed in our application Ser. No. 636,643 filed May 8, 1967.

The acid addition salts of this invention can be prepared by reacting the pyrrole derivatives of the Formula I with either the chemically equivalent amount of organic or inorganic acid in a water-miscible solvent such as acetone or ethanol, with isolation of the salt by concentration and cooling or an excess of the acid in a water immiscible solvent, such as diethyl ether or chloroform, with the desired salt separating directly. Exemplary of such organic salts are those with maleic, fumaric, benzoic, ascorbic, succinic, methanesulphonic benzenesulphonic or hydroxybenzoic acids. The preferred salts of this invention are those with aromatic hydroxy carboxylic acid such as p-hydroxybenzoic, gentisic, gallic, protocatechuic, or β-resorcyclic acids. Exemplary of such inorganic salts are those with hydrochloric, hydrobromic and sulphuric acids. The quaternary ammonium salts of this invention can also be prepared by reacting a new pyrrole derivative of the general Formula I with a lower alkyl halide, such as methyl bromide or methyl iodide.

The new compounds of this invention exhibit favourable pharmacological properties on the central nervous system, peripheral autonomic system or cardiovascular system.

CENTRAL NERVOUS SYSTEM

The compounds of this invention wherein $R_1$ is a lower alkyl radical, such as methyl and ethyl, show marked effects on the central nervous system; these effects are sympathetic excitatory phenomena which, according to the administered dose, consist of hypermotility, tremors and convulsions. The new compounds of this invention enhance the codeine analgetic activity and possess direct analgetic properties.

AUTONOMIC NERVOUS SYSTEM

The new compounds of this invention interact with sympathetic activity and exhibit sympathomimetic as well as sympatholytic effects. On the other hand the parasympathetic section appears scarcely interested. As concerns the sympatholytic activity the preferred compounds are those of the general Formula I wherein $R_1$ is a radical with more than 2 carbon atoms and their acid addition salts. 1-[α-(N-benzyl)-pyrryl]-2-isopropyl-aminoethanol antagonizes the inhibitory sympathomimetic system by electively blocking β-adrenergic receptors. The study of these properties has been carried out by testing:

The pressor response to N-ethyl-noradrenaline, whose hypotensive effect is inverted by 1-[α-(N-benzyl)-pyrryl]-2-isopropyl-aminoethanol; and the tachycardia and the hypotension induced in animals in vivo by N-iso. propyl-noradrenaline. The effective dose evoking the above effects was 3–5 mg./kg. intravenously.

CARDIOVASCULAR SYSTEM

When $R_1$ is a lower alkyl radical and the new compounds of this invention exhibit hypertensive activity and enhance the cardiac frequency, whereas when $R_1$ is a radical with more than 2 carbon atoms they show hypotensive and bradycardial effects.

TOXICITY

In mice and rats the $LD_{50}$ values of the new compounds of this invention are higher than 20 mg./kg. when tested intravenously; doses of about 100 mg./kg. given orally are well tolerated. These derivatives can be administered orally, subcutaneously or intravenously in any pharmaceutical form generally employed for these administration routes.

The following examples illustrate the invention.

Example 1

7 g. (0.022 mol) of 1-[α-(N-benzyl)-pyrryl]-2-(N'-benzyl-N'-methyl)-aminoethanol 1 g. of 5% palladium on carbon and 25 ml. of absolute ethanol are placed in a 100 ml. bottle of an atmospheric pressure hydrogenation apparatus. The mixture is warmed to about 50° C. and is maintained at this temperature until the theoretical amount of hydrogen has been taken up. The catalyst is removed from the reaction mixture by filtration and the solution is concentrated under reduced pressure. The solid residue of 1-[α-(N-benzyl)-pyrryl]-2-methylaminoethanol weighs 5.4 g. and is purified by crystallization from di-isopropyl ether. M.P.=84–86° C.

With analogous procedures have been prepared the following compounds:

1-[α-(N-benzyl)-pyrryl]-2-ethylaminoethanol:
M.P.=94–96° C.
1-[α-(N-benzyl)-pyrryl]-2-propylaminoethanol:
M.P.=95.5–96.5° C.
1-[α-(N-benzyl)-pyrryl]-2-isopropylaminoethanol:
M.P.=135–145° C./0.4–0.5 mm. Hg.
1-[α-(N-benzyl)-pyrryl]-2-isopropylaminoethanol hyd.:
M.P.=101–103° C. (dec.).
1-[α-(N-benzyl)-pyrryl]-2-butylaminoethanol:
M.P.=83–85° C.
1-[α-(N-benzyl)-pyrryl]-2-isobutylaminoethanol:
M.P.=85.5–86.5° C.
1-[α-(N-benzyl)-pyrryl]-2-sec. butylaminoethanol:
B.P.=165–175° C./0.5–0.6 mm. Hg.
1-[α-(N-phenyl)-pyrryl]-2-isopropylaminoethanol:
M.P.=91–93° C.

Example II 6.85 g. (0.03 mol) of 1-benzyl-2-methylaminoacetyl-pyrrole and 55 ml. of methyl alcohol are placed in a 100 ml. four necked flask fitted with a stirrer, a dropping funnel, a reflux condenser and a thermometer. The solution is stirred and a mixture of 2.27 g. (0.06 mol) of sodium borohydride in 6 ml. of water is added slowly through the dropping funnel at such a rate that the solvent refluxes gently without external heating. When the addition is complete and the initial reaction subsides, the mixture is stirred and heated at gentle reflux for six hours.

The solvents are distilled off under reduced pressure. The residue is suspended in water and shaken with diethyl ether, the solvent is removed by evaporation under reduced pressure and the solid residue of 1-[α-(N-benzyl)-pyrryl]-2-methylaminoethanol which weighs 6.2 g. is purified by crystallization from di-isopropyl ether.

What is claimed is:
1. A compound of the formula

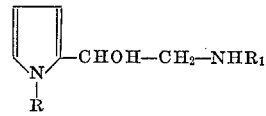

wherein R is selected from the group consisting of phenyl and benzyl, $R_1$ is selected from the group consisting of hydrogen and alkyl containing from 1 to 4 carbon atoms, and its salts with therapeutically suitable organic and inorganic acids and alkyl halides.

References Cited

Wagner and Took—Synthetic Organic Chemistry—John Wiley, New York (1953) pp. 149, 152 and 665.

Chemical Abstracts—Perveer et al., vol. 54, p. 9872 (1959).

ALEX MAZEL, Primary Examiner

B. I. DENTZ, Assistant Examiner

U.S. Cl. X.R.
424—274